3,444,134
PHENOLATED POLYMERS OF ISOPRENE
Anthony C. Soldatos, Kendall Park, N.J., assignor to Union Carbide Corporation, a corporation of New York
No Drawing. Continuation-in-part of application Ser. No. 572,912, Aug. 17, 1966. This application Feb. 7, 1967, Ser. No. 614,408
Int. Cl. C08g 5/02
U.S. Cl. 260—47
10 Claims

ABSTRACT OF THE DISCLOSURE

This invention relates to phenolated polymers of isoprene which are prepared by reacting a substituted phenol with a polymer of isoprene. The phenolated polymers of isoprene are particularly useful as additives to ethylene-propylene elastomers.

---

This application is a continuation-in-part of copending application Ser. No. 572,912 filed Aug. 17, 1966.

This invention relates to phenolated polymers of isoprene. More particularly, this invention relates to phenolated polymers of isoprene which, when added to ethylene-propylene elastomers provide compositions which are characterized by excellent tack and excellent compressive set and are therefore particularly desirable for use in the manufacture of automobile tires, conveyer belts and other like energy absorbing products.

In the past, attempts to improve the tack of ethylene-propylene elastomers by the addition thereto of various additives, have not proved to be particularly successful. For instance, it has been proposed to add to these polymers such additives as alkylated phenol-formaldehyde resins. These and other comparable additives have not materially improved the tack of ethylene-propylene polymers to the extent of allowing these polymers to be successfully used in the production of automobile tires, conveyer belts and the like. In addition, some of these additives have significantly lowered the tensile strength and tensile modulus of the ethylene-propylene polymers to which they have been added.

The present invention provides phenolated polymers of isoprene which, when added to ethylene-propylene polymers, result in compositions which have sufficient tack to be used successfully in the production of automobile tires on a commercial scale. Furthermore, these compositions possess excellent cohesive or green strength which helps insure that, when stock formed from these compositions is pressed into contact, one with another, there is no failure or fracture of material on either side of the adhesive bond prior to the curing step.

In addition to the excellent properties described above, the phenolated polymers of this invention, when added to ethylene-propylene polymers, provide compositions which when cured are characterized by excellent compression set. The excellent compression set of cured compositions containing the phenolated polymers of this invention is manifested, in the cured product, by excellent resiliency and longer working life.

Illustrative of polymers of isoprene which are phenolated, in accordance with this invention, are homopolymers of isoprene which generally have a number average molecular weight of about 500 to about 30,000, preferably a number average molecular weight of about 500 to about 10,000 and more preferably have a number average molecular weight of about 1,000 to 8,000; and which contain less than about 50 percent by weight and preferably less than about 20 percent by weight internal unsaturation (based on the weight of the total unsaturation).

Number average molecular weight was determined by vapor phase osmometry.

Total unsaturation was determined by Wijs method tion (based on the weight of the total unsaturation).

Internal unsaturation was determined by nuclear magnetic resonance and infra-red analysis.

Internal unsaturation as used herein refers to unsaturated units which make-up the backbone of the polymer as opposed to pendant unsaturated units.

For instance, internal unsaturation with respect to isoprene refers to the percent by weight of the diene units of isoprene (2-methyl butadiene-1,3) which have combined at the 1,4 position as opposed to the 1,2 and 3,4 positions.

1,4-position

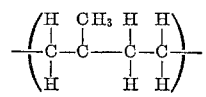

1,2-position

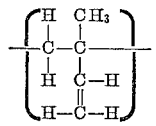

3,4-position

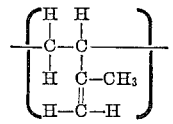

It is to be understood that homopolymers of isoprene as used herein are intended to include halogenated, hydronated and other like homopolymers of isoprene.

Preparation of polymers of isoprene, particularly homopolymers of isoprene, having the number average molecular weight and the unsaturation previously described can be conducted as described in this application and also as described in the following articles:

Quarterly Review, vol. 16, pages 316–1962, "Stereo Regular Addition Polymerization," C. F. H. Bawan and A. Ledwith.

Journal of Polymer Science, vol. 3, pages 2223–28 (1965), "Solvent Effects in Anionic Copolymerization Reactivity of Dienes," K. F. O'Driscoll.

Journal of Polymer Science, vol. 27 (1957), "Polymerization of Isoprene With Lithium Dispersions and Lithium Alkyls Using Tetrahydrofuran As Solvents," Henry Hsieh, D. J. Kelly, A. V. Tobolsky.

Journal of Polymer Science, vol. 40, pages 73–89 (1959), "Isoprene Polymerization by Organometallic Compounds," A. V. Tobolsky, C. E. Rogers.

Among other suitable polymers of isoprene are those obtained by polymerizing isoprene with one or more of a compound having at least one olefinic double bond to obtain a copolymer or interpolymer having the number average molecular weight and the internal unsaturation previously defined and containing at least about 70 percent by weight combined isoprene. Exemplary of suitable monomers having at least one olefinic double bond are described subsequently in this application. These polymers can be hydrogenated, halogenated and the like as previously described.

Illustrative of phenols which can be reacted with a polymer of isoprene to produce phenolated polymers of isoprene are those compounds which have the formula:

wherein R is an aromatic hydrocarbon radical containing 18 to 31 carbon atoms inclusive and preferably containing 18 to 25 carbon atoms inclusive and n is an integer having a value of 1 to 3 inclusive.

Especially desirable phenols are those having the formula:

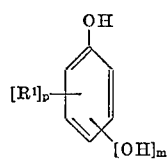

wherein each $R^1$, which can be the same or different, is an alkyl radical generally containing 12 to 25 carbon atoms inclusive and preferably containing 12 to 19 carbon atoms inclusive, an alkoxy radical generally containing 12 to 25 carbon atoms inclusive and preferably containing 12 to 19 carbon atoms inclusive, a cycloaliphatic radical generally containing 12 to 25 carbon atoms inclusive and preferably containing 12 to 19 carbon atoms inclusive, nitro, sulfone, sulfur, or halogen, i.e., chlorine, bromine, fluorine or iodine; $p$ is an integer having a value of 0 to 5 inclusive, $m$ is an integer having a value of 0 to 3 inclusive and the maximum sum of $p+m=5$.

Illustrative of suitable phenols are the following: nitrophenol, thiophenol, alkylated phenols such as p-dodecyl phenol, o-dodecyl phenol, p-eicosyl phenol, 2,4-didodecyl phenol, and the like; alkoxylated phenols, exemplary of which are p-dodecoxy phenol, eicoxy phenol and the like; halogenaated phenols such as ortho, meta, or para bromo phenol, 2,4-dichlorophenol and 2,3,5-trichlorophenol, 3-chloro-4-methyl phenol, 4-bromo-6-ethoxy phenol and the like. α-butyl styryl phenol and the like; alkylated dihydroxy phenols such as 1,3-dihydroxy-4-dodecylbenzene, 1,2-dihydroxy-4-eicosylbenzene and the like; alkoxylated dihydroxy phenols such as 1,4-dihydroxy-2-n-dodecoxybenzene and the like; cycloaliphatic phenols such as p-(2-ethylhexylcyclopentyl)phenol and the like; halogenated dihydroxy phenols such as 1,2-dihydroxy-4-chlorobenzene and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Patent 3,177,166, issued Apr. 6, 1965, to J. T. Gregory et al.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated, are copolymers of ethylene-propylene and interpolymers of ethylene-propylene and a polymerizable monomer having at least one olefinic double bond wherein, in each case, the combined ethylene and combined propylene are defined above.

Illustrative of suitable mono-olefinic compounds are those having the formula:

$$R^2-CH=CH_2$$

where $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, n-propyl, n-hexyl, 2-ethylhexyl and the like; aromatic radicals such as phenyl, naphthyl and the like; cycloaliphatic radicals such as cyclohexyl, n-propyl cyclohexyl and the like.

Methods for preparing copolymers of ethylene-propylene and interpolymers of ethylene-propylene and a mono-olefinic compound are described in detail in U.S. Patents 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Patents 3,000,866 to R. E. Tarney and 3,211,709 to S. Adamek et al.

Especially desirable diene monomers are hexadiene-1,4 dicyclopentadiene, ethylidene bicycloheptene and the like.

The polymers of isoprene, as described, are added to the ethylene-propylene polymers in amounts sufficient to improve the tack thereof. As a rule, this amount ranges from about 8 to about 100 percent by weight isoprene polymer based on the weight of ethylene-propylene polymer. Particularly effective results are achieved using from about 12 to about 20 percent by weight isoprene polymer based on the weight of the ethylene-propylene polymer.

It is to be understood that mixtures of isoprene polymers and/or mixtures of ethylene-propylene polymers can be used if so desired. The addition of one to the other can be carried out in a two-roll mill, a Banbury or a twin-screw extruder.

To the compositions of this invention can be added pigments, fillers, lubricants, plasticizers, curing agents, accelerators, stabilizers, antioxidants and the like as is well-known in the art. Specific additives are pigments such as carbon black and clay; lubricants such as stearic acid and plasticizers such as napthenic oils.

In those instances wherein the compositions of this invention contain a polymer of ethylene-propylene which is devoid of olefinic unsaturation, for instance, a copolymer of ethylene and propylene, or an interpolymer of ethylene-propylene and a mono-olefinic compound, the compositions can be cured to elastomeric products using an organic peroxide such as dicumyl peroxide. In those instances wherein the polymer of ethylene-propylene contains olefinic unsaturation such as an interpolymer of ethylene-propylene and hexadiene-1,4, the compositions can be cured to elastomeric products using sulfur.

The amount of curing agent, the length of the curing cycle and the temperature thereof will depend, in each instance, upon the exact formulation of the compositions, as for example, is described in U.S. Patent 3,200,174 and also described in this application.

In order to demonstrate the excellent "tack" possessed by the compositions of this invention, various isoprene polymers were prepared, admixed with ethylene-propylene polymers and the resultant compositions tested for "tack."

The test for tack was carried out by forming strips, one inch by six inches by 1/8 of an inch, from the compositions to be tested, pressing two such strips together using a two-pound roller and then manually pulling the strips apart. "Tack" was judged on the basis of the difficulty encountered in attempting to manually separate the strips. Results reported were based on intervals of time from the time at which the compositions were formulated.

PREPARATION OF POLYMER A—POLYISOPRENE

Into a two-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gram portions over a period of one hour. During the addition of the isoprene, the temperatue of the reaction mixture was maintained at 50° C.–55° C. After the addition of the isoprene, the reaction mixture was maintained at a temperature of 60° C. for 2 hours while being constantly stirred. Methanol was added to the mixture and the product polyisoprene was recovered as the methanol insoluble portion of mixtures. The polyisoprene was stabilized by adding thereto 0.05 gram of 2,6-di-t-butyl-4-methylphenol and then dried by being placed in a vacuum oven for 18 hours. The vacuum oven was at a temperature of 40° C. and was operating under a pressure of 5 mm. Hg.

*Analysis.*—Number average molecular weight, 2,000; percent internal unsaturation, 5; yield, 116 grams of a viscous liquid.

PREPARATION OF POLYMER B—PHENOLATED POLYISOPRENE

Into a two-liter flask equipped with a stirrer and reflux condenser, there was charged 602 grams of p-dodecylphenol and 40 grams of polyisoprene (Polymer A). To this mixture there was then added 10.4 grams of p-toluene sulfonic acid and the reaction mixture heated to a temperature of about 80° C. and maintained at this temperature for seven hours while under a nitrogen gas atmosphere. After this seven-hour period, the reaction mixture was allowed to stand for 24 hours at a temperature of about 30° C. The phenolated polyisoprene was recovered as described with respect to Polymer A.

*Analysis.*—Number average molecular weight, 2,700; melting point, 87° C.–92° C.; percent by weight combined p-dodecylphenol, 23 based on the total weight of the isoprene polymer; percent internal unsaturation, 5.

| Masterbatch Composition I: | Parts by weight |
|---|---|
| Terpolymer of ethylene-propylene-1,4-hexadiene containing 52 percent by weight combined ethylene, 48 percent by weight combinded propylene with the remainder being 1,4-hexadiene | 100 |
| Zinc oxide | 5 |
| Stearic aid | 1 |
| Carbon black | 80 |
| Naphthenic oil | 40 |
| Sulfur | 1.5 |
| Tetramethylthiuran monosulfide | 1.5 |
| 2-mercaptobenzothiazole | 0.75 |

To samples of the masterbatch composition, were added various amounts of isoprene polymers. Each isoprene polymer was dispersed in the sample of the masterbatch by a milling operation on a two-roll mill which had been preheated to a temperature of 80° C.–90° C. Each composition was sheeted on the two-roll mill and cut into strips, 1 inch by 6 inches by ⅛ of an inch. These strips were then used in the tack test previously described. The results of these tests are shown in Table I below.

Strips were also prepared from samples of this masterbatch composition to which no isoprene was added in one case and to which a p-dodecylphenol-formaldehyde novolak resin was added in a second case.

TABLE I

| Polymer | Parts by weight polymer based on the weight of ethylene-propylene polymer | Tested for tack | | |
|---|---|---|---|---|
| | | 1 day | 3 days | 30 days |
| 1. Polymer B | 8 | Very good tack | Very good tack | Very good tack. |
| 2. Polymer B | 10 | do | do | Do. |
| 3. Polymer B | 15 | Strips were non-separable. | Strips were non-separable. | Strips were non-separable. |
| 4. Control 1 (phenol-formaldehyde resin) | 15 | Slight tack | Slight tack | Slight tack. |
| 5. Control 2 (no additive) | 0 | No tack | No tack | No tack. |

PREPARATION OF POLYMER C—PHENOLATED POLYISOPRENE

Into a two-liter flask, equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for Polymer B.

*Analysis.*—Number average molecular weight, 3,400 melting point, 82° C.–84° C.; percent by weight combined thiophenol, 15 based on the total weight of the isoprene polymer; percent internal unsaturation, 15.

The polyisoprene used in this example was a liquid product having a number average molecular weight of 3,000 and having 15 percent internal unsaturation.

A masterbatch composition, the formulation of which is noted below, was compounded to a blend in a Banbury mixer.

A second masterbatch composition, Masterbatch Composition II, was formulated using as the ethylene-propylene polymer, a copolymer of ethylene-propylene containing 58 percent by weight combined ethylene and 42 percent by weight combined propylene. To this masterbatch was then added various isoprene polymers and the resultant composition tested for tack. The exact formulation of the masterbatch composition, the isoprene polymers added and the test results of the resultant compositions are noted below.

| Masterbatch Composition II: | Parts by weight |
|---|---|
| Copolymer of ethylene-propylene | 100 |
| Carbon black | 45 |
| Calcium stearate | 1 |
| Zinc oxide | 5 |
| Naphthenic oil | 5 |
| Dicumyl peroxide | 2.6 |
| Sulfur | 0.3 |

TABLE II

| Polymer | Parts by weight polymer based on the weight of ethylene-propylene polymer | Tested for tack | | |
|---|---|---|---|---|
| | | 1 day | 3 days | 30 days |
| 6. Polymer B | 10 | Very good tack | Very good tack | Very good tack. |
| 7. Polymer B | 15 | Strips were non-separable. | Strips were non-separable. | Strips were non-separable. |
| 8. Polymer C | 10 | Very good tack | Very good tack | Very good tack. |

As previously pointed out, the compositions of this invention not only have significantly better tack than do compositions containing presently known "tackifiers" such as p-dodecyl phenolformaldehyde novolak resin but, in addition, the physical properties of the compositions of this invention compare favorably with the physical properties of compositions containing these presently known tackifiers. This is established by the data of Table III below. The compositions of Table III were formulated by adding to samples of Masterbatch Composition I various amounts of isoprene polymers and p-dodecyl phenolformaldehyde novolak resin.

Eighty grams of each composition so formulated were formed into plaques 6 inches by 6 inches and cured, under a pressure of 750 p.s.i., for 30 minutes, at a temperature of 154° C. Tests were then conducted as indicated in Table III.

Each composition was also formed into strips and tested for tack in a manner as previously described.

Compression set in percent
Control 1 _____ 10.
Control 2 _____ 60 percent greater than Control 1.
Composition I _____ Less than 20 percent greater than Control 1.

The data clearly shows that Composition I increased the compression set of the basic composition (Control 1) less than 20 percent. Control 2, on the other hand, increased the compression set of the basic composition 60 percent.

What is claimed is:

1. A phenolated polymer which is the addition reaction product of: (a) homopolymer of isoprene, or (b) a polymer of isoprene and at least one monomer having at least one olefinic double bond, said polymer containing at least about 70 percent by weight combined isoprene, and a phenol which has the formula:

$$R(OH)_n$$

TABLE III

| Polymer | Parts by weight polymer based on the weight of ethylene-propylene polymer | Tested for tack | | | ASTMD-412 (p.s.i.) | |
|---|---|---|---|---|---|---|
| | | 1 day | 3 days | 30 days | Tensile modulus | Tensile strength |
| 9. p-Dodecylphenolformaldehyde novolak resin. | 10 | Fair tack | Fair tack | No tack | 752 | 2,755 |
| 10. Polymer B | 15 | Strips were non-separable. | Strips were non-separable. | Strips were non-separable. | 759 | 3,095 |

Phenolated polymers of this invention, as previously pointed out, when added to ethylene-propylene polymers provide compositions which are characterized by excellent compression set. This is evidenced by the data which is set forth below with respect to Composition I, Control 1 and Control 2.

Composition I.—200 grams of Masterbatch Composition I and Polymer B wherein Polymer B was present in an amount of 10 percent weight based on the weight of the ethylene-propylene polymer of the masterbatch composition.

Control 1.—200 grams of Masterbatch Composition I.

Control 2.—200 gram sample of Masterbatch Composition I and a phenolated polymer, prepared as described below, wherein the phenolated polymer was present in an amount of 10 percent by weight based on the weight of the ethylene-propylene polymer of the masterbatch composition.

The phenolated polymer of Control 2 was prepared by charging in a two-liter flask, equipped with a stirrer and reflux condenser, 520 grams of p-nonylphenol and 40 grams of polyisoprene (Polymer A). To the mixture there was then added 10.4 grams of p-toluene sulfonic acid and the reaction mixture heated to a temperature of about 80° C. and maintained at this temperature for seven hours while under a nitrogen gas atmosphere. After this seven-hour period, the reaction mixture was allowed to stand for 24 hours at a temperature of about 30° C. The phenolated polyisoprene was recovered as described with respect to Polymer A.

Analysis.—Number average molecular weight, 2,600; melting point, 92° C.–98° C.; percent by weight combined p-nonylphenol, 20 based on the total weight of the isoprene polymer; percent internal unsaturation, 5.

Composition I, Control 1 and Control 2 were compression molded into plaques 4½ inches by 7 inches by 0.075 inch under a pressure of 2,000 pounds and at a temperature of 310° F. utilizing a 30-minute cycle. The plaques were then post cured at ambient temperatures for 16 hours and then tested according to ASTM test D395-B.

wherein R is an aromatic hydrocarbon radical containing 18 to 31 carbon atoms inclusive and $n$ is an integer having a value of 1 to 3 inclusive.

2. A phenolated polymer as defined in claim 1 containing about 5 to about 75 percent by weight combined phenol based on the total weight of the said polymer.

3. A phenolated polymer as defined in claim 1 containing about 10 to about 40 percent by weight combined phenol based on the total weight of said polymer.

4. A phenolated polymer as defined in claim 1 wherein the isoprene polymer is a homopolymer of isoprene.

5. A phenolated polymer as defined in claim 1 wherein the phenol has the formula:

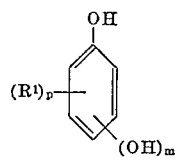

wherein each $R^1$ is an alkyl radical containing 12 to 25 carbon atoms inclusive, or an alkoxy radical containing 12 to 25 carbon atoms inclusive, or a cycloaliphatic radical containing 12 to 25 carbon atoms inclusive, or nitro or a halogen atom, $p$ is an integer having a value of 0 to 5 inclusive, $n$ is an integer having a value of 0 to 3 inclusive and the maximum sum of $p+m=5$.

6. A phenolated polymer as defined in claim 1 wherein the isoprene polymer is polyisoprene and the phenol is p-dodecylphenol.

7. A phenolated polymer as defined in claim 1 wherein the said phenolated polymer has a number average molecular weight of about 500 to about 30,000 and contains less than about 50 percent by weight internal unsaturation.

8. A phenolated polymer as defined in claim 1 wherein said phenolated polymer has a number average molecular weight of about 500 to about 10,000 and contains less than about 50 percent by weight internal unsaturation.

9. A phenolated polymer as defined in claim 1 wherein said phenolated polymer has a number average molecular weight of about 1,000 to 8,000 and contains less than about 20 percent by weight internal unsaturation.

10. A phenolated polymer as defined in claim 7 wherein the isoprene polymer is polyisoprene and the phenol is p-dodecylphenol.

References Cited

UNITED STATES PATENTS 2,932,622  4/1960  Bloch _____ 260—4
3,110,699  11/1963  Shcmitz-Josten _____ 260—62
3,383,362  5/1968  Gonzenbach _____ 260—62
3,177,166  4/1965  Gregory et al. _____ 260—5

JOSEPH L. SCHOFER, *Primary Examiner.*

C. A. HENDERSON, Jr., *Assistant Examiner.*

U.S. Cl. X.R.

152—330; 260—5, 41.5, 79.5, 94.7

Disclaimer 3,444,134.—*Anthony C. Soldatos*, Kendall Park, N.J. PHENOLATED POLYMERS OF ISOPRENE. Patent dated May 13, 1969. Disclaimer filed Jan. 22, 1971, by the assignee, *Union Carbide Corporation*.

Hereby enters this disclaimer to claims 1 through 6 of said patent.
[*Official Gazette May 25, 1971.*]